US012243463B2

(12) United States Patent
Lee et al.

(10) Patent No.: US 12,243,463 B2
(45) Date of Patent: Mar. 4, 2025

(54) DISPLAY DEVICE

(71) Applicant: Samsung Display Co., Ltd., Yongin-si (KR)

(72) Inventors: Wonbok Lee, Seongnam-si (KR); Nam Hyeon Jeon, Seoul (KR); Gunhee Chung, Suwon-si (KR); Hyunkyung Song, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/082,135

(22) Filed: Dec. 15, 2022

(65) Prior Publication Data

US 2023/0306888 A1 Sep. 28, 2023

(30) Foreign Application Priority Data

Mar. 25, 2022 (KR) ........................ 10-2022-0037568

(51) Int. Cl.
*G09G 3/20* (2006.01)

(52) U.S. Cl.
CPC ... *G09G 3/2003* (2013.01); *G09G 2300/0452* (2013.01); *G09G 2310/08* (2013.01); *G09G 2320/0233* (2013.01); *G09G 2320/0285* (2013.01); *G09G 2320/0626* (2013.01); *G09G 2360/16* (2013.01)

(58) Field of Classification Search
CPC ....... G09G 2300/0452; G09G 2310/08; G09G 2320/0233
See application file for complete search history.

(56) References Cited

U.S. PATENT DOCUMENTS 7,515,128 B2 4/2009 Dowling
2002/0030673 A1* 3/2002 Ikemoto .................. G09G 3/20 345/204
2008/0136926 A1* 6/2008 Hatanaka ............... H04N 23/68 348/208.99
2008/0204378 A1* 8/2008 Park ..................... G09G 3/3208 345/77
2013/0287292 A1* 10/2013 Ono ....................... G06V 20/10 382/154
2017/0278463 A1* 9/2017 Fujii ........................ G09G 3/20

FOREIGN PATENT DOCUMENTS

EP 1534019 A2 5/2005
KR 1020050049008 A 3/2006

OTHER PUBLICATIONS

Shiga, et al., Power Reduction of OLED Displays by Tone Mapping Based on Helmholtz—Kohlrausch Effect, IEICE Trans. Electron., vol. E100-C, No. 11, Nov. 2017, pp. 1026-1030.

* cited by examiner

*Primary Examiner* — Van N Chow
(74) *Attorney, Agent, or Firm* — CANTOR COLBURN LLP

(57) ABSTRACT

A display device may include a display panel including pixels, and a display panel driver which drives the display panel. The display panel driver determines whether input image data displays a white image and whether the input image data displays a moving image, and adjusts an input saturation value of the input image data based on whether the input image data displays the white image and whether the input image data displays the moving image to generate correction image data.

19 Claims, 13 Drawing Sheets c=0.08 d=1
case4: IS=0
case5: IS=0.5
case6: IS=1

DISPLAY DEVICE

This application claims priority to Korean Patent Application No. 10-2022-0037568, filed on Mar. 25, 2022, and all the benefits accruing therefrom under 35 U.S.C. § 119, the content of which in its entirety is herein incorporated by reference.

BACKGROUND

1. Field

Embodiments of the invention relate to a display device. More particularly, embodiments of the invention relate to a display device in which saturation is adjusted.

2. Description of the Related Art

Generally, a display device may include a display panel, a timing controller, gate driver, and a source driver. The display panel may include a plurality of gate lines, a plurality of data lines, and a plurality of pixels electrically connected to the gate lines and the data lines. The gate driver may provide gate signals to the gate lines. The source driver may provide data voltages to the data lines. The timing controller may control the gate driver and the source driver.

SUMMARY

The higher the saturation of an image, the brighter the image. This phenomenon is called the Helmholtz-Kohlrausch effect (hereinafter, referred to as the "H-K effect"), and a display device may display the image brighter by adjusting the saturation of the image using the H-K effect. However, when the saturation is adjusted in an image having a high white ratio (hereinafter, referred to as a "white image"), a decrease in luminance and/or a change in color may be generated or recognized conspicuously.

Embodiments of the invention provide a display device that adjusts input saturation value.

Embodiments of the invention also provide a display device that adjusts input brightness value.

According to embodiments of the invention, a display device includes a display panel including pixels, and a display panel driver which drives the display panel, where the display panel driver determines whether input image data displays a white image and whether the input image data displays a moving image, and adjusts an input saturation value of the input image data based on whether the input image data displays the white image and whether the input image data displays the moving image to generate correction image data.

In an embodiment, the display panel driver may maintain the input saturation value when the input image data displays the white image, and the display panel driver may adjust the input saturation value based on a first saturation lookup table when the input image data does not display the white image.

In an embodiment, the first saturation lookup table may include a correction saturation value of the correction image data corresponding to the input saturation value, and the first saturation lookup table may be changed based on an input brightness value of the input image data.

In an embodiment, the correction saturation value may be determined using the following equation: CS=IS*(IV*(−a)+b), where CS denotes the correction saturation value, IS denotes the input saturation value, IV denotes the input brightness value, a denotes a first saturation coefficient, and b denotes a second saturation coefficient.

In an embodiment, the display panel driver may adjust the input saturation value based on the first saturation lookup table of a current frame and second saturation lookup tables generated through interpolation between the first saturation lookup table of the current frame and the first saturation lookup table of each of previous frames when the input image data does not display the white image and displays the moving image.

In an embodiment, the display panel driver may adjust the input saturation value based on a third saturation lookup table generated by calculating an average of the second saturation lookup tables.

In an embodiment, the display panel driver may apply a saturation weight to each of the second saturation lookup tables, and adjust the input saturation value based on a third saturation lookup table generated by calculating an average of the second saturation lookup tables to which the saturation weight is applied.

In an embodiment, the saturation weight may increase as a distance between two frames between which the interpolation is performed decreases.

In an embodiment, the display panel driver may maintain an input brightness value of the input image data when the input image data displays the white image, and the display panel driver may adjust the input brightness value based on a first brightness lookup table when the input image data does not display the white image.

In an embodiment, the first brightness lookup table may include a correction brightness value of the correction image data corresponding to the input brightness value, and the first brightness lookup table may be changed based on the input saturation value of the input image data.

In an embodiment, the correction brightness value may be determined using the following equation: CS=IV*(IS*(−c)+d), where CV denotes the correction brightness value, IS denotes the input saturation value, IV denotes the input brightness value, c denotes a first brightness coefficient, and d denotes a second brightness coefficient.

In an embodiment, the display panel driver may calculate an average value of the input saturation value, and increase the first brightness coefficient when the average value of the input saturation value is less than a reference saturation value.

In an embodiment, the display panel driver may adjust the input brightness value based on the first brightness lookup table of a current frame and second brightness lookup tables generated through interpolation between the first brightness lookup table of the current frame and the first brightness lookup table of each of previous frames when the input image data does not display the white image and displays the moving image.

In an embodiment, the display panel driver may determine the input image data as the input image data displaying the white image when a number of the input saturation value smaller than a reference saturation value is greater than or equal to a first reference number.

In an embodiment, the display panel driver may change the reference saturation value when the input image data displaying the white image and the input image data not displaying the white image are alternately input over N frames, where N is a positive integer greater than or equal to 2.

In an embodiment, the display panel driver may calculate a sum of deviations of an R value, a G value, and a B value of RGB data of the input image data for each of the pixels, and determine the input image data as the input image data displaying the white image when a number of the RGB data in which the sum of the deviations is less than a reference deviation value is greater than or equal to a second reference number.

In an embodiment, the display panel driver may determine the input image data as the input image data displaying the moving image when a difference value between the input image data of a previous frame and the input image data of a current frame is greater than or equal to a reference difference value.

In an embodiment, the display panel driver may change the reference difference value when the input image data displaying the moving image and the input image data not displaying the moving image are alternately input over N frames, where N is a positive integer greater than or equal to 2.

According to embodiments of the invention, a display device includes a display panel including pixels, and a display panel driver which drives the display panel, where the display panel driver determines whether input image data displays a white image and whether the input image data displays a moving image, and adjusts an input brightness value of the input image data based on whether the input image data displays the white image and whether the input image data displays the moving image to generate correction image data.

In an embodiment, the display panel driver may maintain the input brightness value when the input image data displays the white image, the display panel driver may adjust the input brightness value based on a first brightness lookup table when the input image data does not display the white image, the first brightness lookup table may include a correction brightness value of the correction image data corresponding to the input brightness value, and the first brightness lookup table may be changed based on an input saturation value of the input image data.

Accordingly, in such an embodiment, the display device may adjust an input saturation value when a white image data is not displayed and prevent a sudden change in saturation when a moving image is displayed by determining whether input image data displays the white image and whether the input image data displays the moving image, to adjust the input saturation value of the input image data based on whether the input image data displays the white image and whether the input image data displays the moving image to generate correction image data.

In an embodiment, the display device may adjust an input brightness value of the input image data when a white image data is not displayed and prevent a sudden change in brightness when a moving image is displayed by determining whether input image data displays the white image and whether the input image data displays the moving image, to adjust the input brightness value of the input image data based on whether the input image data displays the white image and whether the input image data displays the moving image to generate correction image data.

In such an embodiment, the display device may increase saturation of an image by adjusting the input saturation value. In such an embodiment, when the saturation of the image is increased, even when brightness of the image is decreased, the image is displayed more colorfully, thereby preventing the user from recognizing a change in the image according to a decrease in luminance caused by a decrease in the brightness. Accordingly, the display device may reduce power consumption by displaying the image brighter without an increase in luminance.

DETAILED DESCRIPTION

Figure 1:
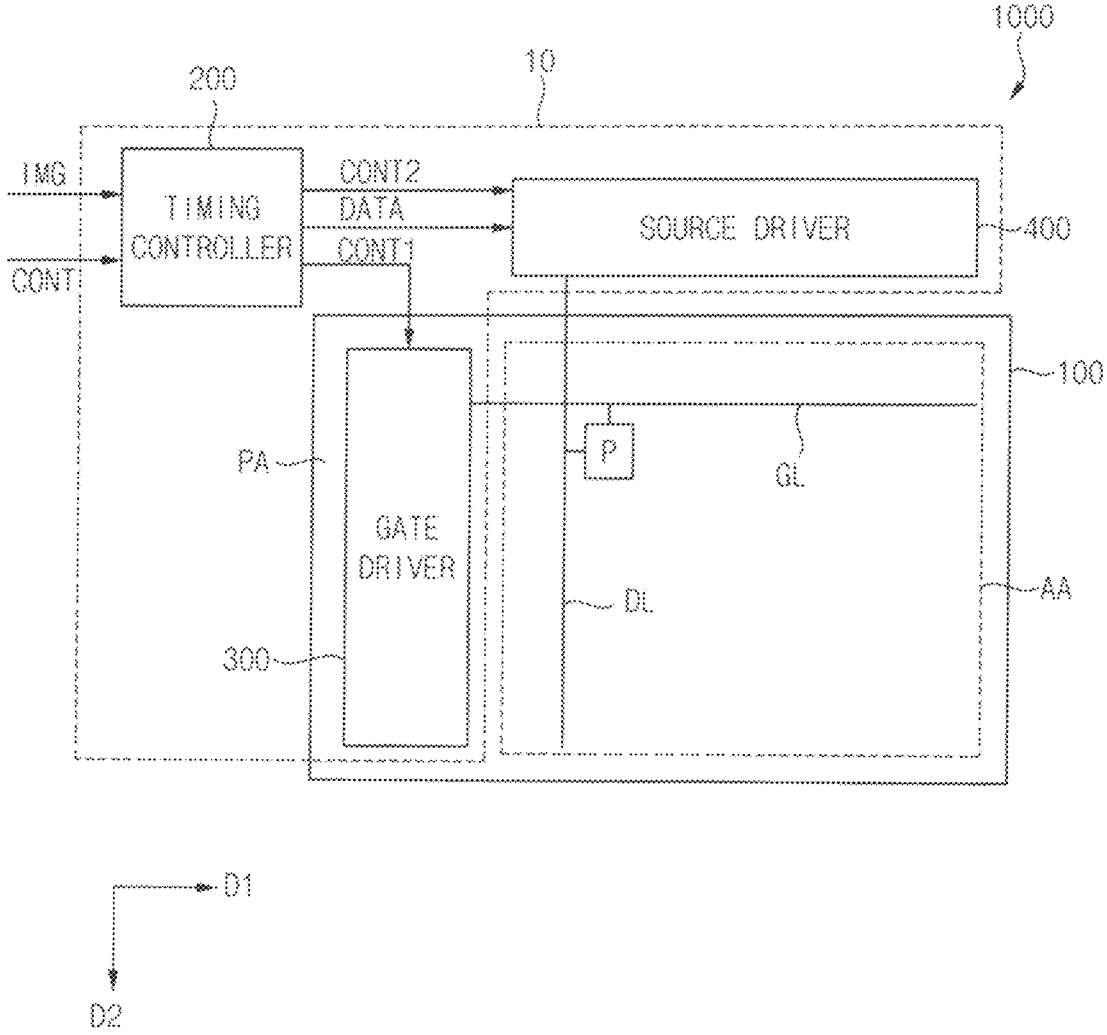
FIG. 1 is a block diagram illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display device 1000 according to embodiments of the invention.

Referring to FIG. 1, an embodiment of the display device 1000 may include a display panel 100, a timing controller 200, a gate driver 300, and a source driver 400. In an embodiment, the timing controller 200 and the source driver 400 may be integrated into one chip, e.g., a single chip.

The display panel 100 includes a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit; GPU). In an embodiment, for example, the input image data IMG may include red image data, green image data and blue image data. In an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the source driver 400 based on the input control signal CONT and output the second control signal CONT2 to the source driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the source driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The source driver 400 may receive the second control signal CONT2 and the data signal DATA from the timing controller 200. The source driver 400 may convert the data signal DATA into data voltages having an analog type. The source driver 400 may output the data voltage to the data lines DL.

Figure 2:
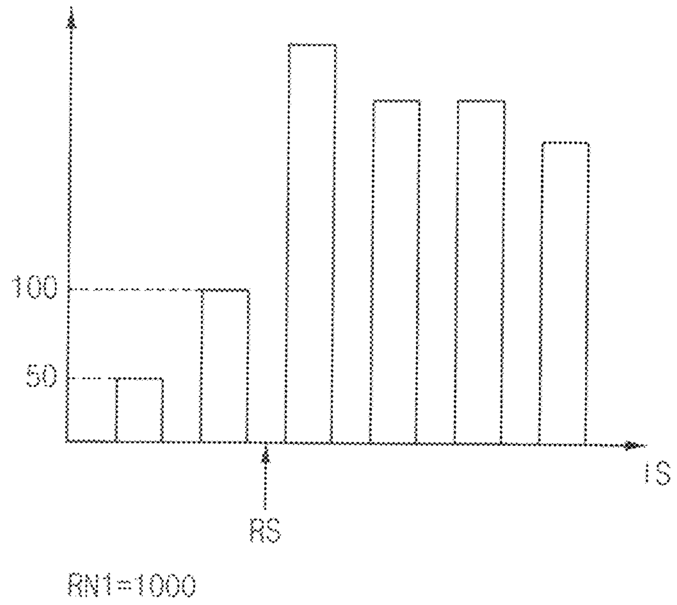
FIG. 2 is a histogram illustrating an example in which the display device of FIG. 1 determines whether input image data displays a white image.
Figure 3:
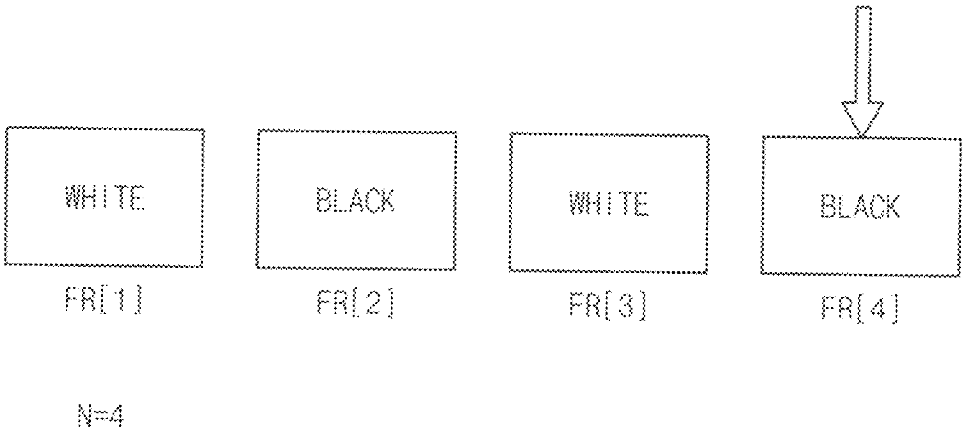
FIG. 3 is a conceptual diagram illustrating an example in which the display device of FIG. 1 changes a reference saturation value.

FIG. 2 is a histogram illustrating an example in which the display device 1000 of FIG. 1 determines whether the input image data IMG displays a white image, and FIG. 3 is a conceptual diagram illustrating an example in which the display device IMG of FIG. 1 changes a reference saturation value RS.

Referring to FIGS. 1 to 3, in an embodiment, the timing controller 200 may determine whether the input image data IMG displays the white image. The timing controller 200 may determine the input image data IMG as the input image data IMG displaying the white image (or the input image data IMG corresponding to the white image) when the number of the input saturation value IS smaller than the reference saturation value RS is greater than or equal to a first reference number RN1.

In an embodiment, for example, the timing controller 200 may convert the input image data IMG of a RGB domain into a HSV domain and generate the histogram of the input saturation value (i.e., the S value of the HSV domain) of the input image data IMG. The timing controller 200 may calculate the number of the input saturation value IS smaller than the reference saturation value RS by using the histogram, and may compare the number of the input saturation value IS smaller than the reference saturation value RS to the first reference number RN1.

In a case, for example, as shown in FIG. 2, the number of the input saturation value IS smaller than the reference saturation value RS may be 150 (i.e., 100+50=150), and the first reference number RN1 may be 1000. In this case, the timing controller 200 may determine that the input image data IMG does not display the white image.

In an embodiment, the timing controller 200 may change the reference saturation value RS when the input image data IMG displaying the white image and the input image data IMG not displaying the white image are alternately input over N frames, where N is a positive integer greater than or equal to 2. In an alternative embodiment, the timing controller 200 may change the first reference number RN1 when the input image data IMG displaying the white image and the input image data IMG not displaying the white image are alternately input over N frames.

In an embodiment, for example, as shown in FIG. 3, in a case where N is 4, the input image data IMG in a first frame FR[1] displays the white image, the input image data IMG in a second frame FR[2] displays a black image, the input image data IMG in the third frame FR[3] displays the white image, and the input image data IMG in a fourth frame FR[4] displays the black image, the reference saturation value RS and/or the first reference number RN1 may be changed in the fourth frame FR[4].

Accordingly, even when the input image data IMG displaying the white image and the input image data IMG not displaying the white image are alternately input from an outside (e.g., by another manufacturer) to find out the reference saturation value RS and/or the first reference number RN1, the reference saturation value RS and/or the first reference number RN1 may be effectively prevented from being externally found out by being changed.

Figure 4:
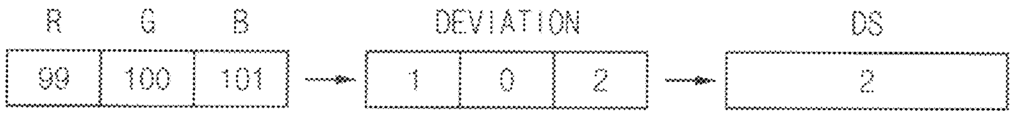
FIG. 4 is a conceptual diagram illustrating another example in which the display device of FIG. 1 determines whether input image data displays a white image.
Figure 5:
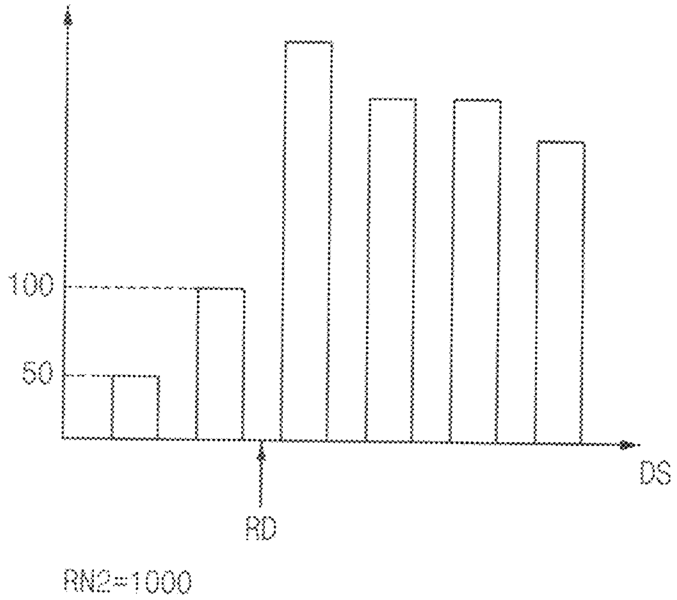
FIG. 5 is a histogram illustrating another example in which the display device of FIG. 1 determines whether input image data displays a white image.

FIG. 4 is a conceptual diagram illustrating another example in which the display device 1000 of FIG. 1 determines whether the input image data IMG displays the white image, and FIG. 5 is a histogram illustrating another example in which the display device 1000 of FIG. 1 determines whether the input image data IMG displays the white image.

Referring to FIGS. 1, 4, and 5, in an embodiment of the timing controller may calculate a sum DS of deviations of an R value, a G value, and a B value of RGB data for each of the pixels P of the input image data IMG, and determine the input image data IMG as the input image data IMG displaying the white image when the number of the RGB data in which the sum DS of the deviations is less than a reference deviation value RD is greater than or equal to a second reference number RN2.

The input image data IMG may display an image in each of the pixels P based on the RGB data. The R value of the RGB data may be a value corresponding to grayscale for red, the G value may be a value corresponding to the grayscale for green, and the B value may be a value corresponding to the grayscale for blue.

In an embodiment, the deviations of the R value, the G value, and the B value may be deviations of the R value, the G value, and the B value for an average value of the R value, the G value, and the B value. In an alternative embodiment, the deviations of the R value, the G value, and the B value may be deviations of the R value, the G value, and the B value for a median value of the R value, the G value, and the B value. In another alternative embodiment, the deviations of the R value, the G value, and the B value may be deviations of the R value, the G value, and the B value for any one of the R value, the G value, and the B value.

In a case, for example, as shown in FIG. 4, the average value of the R value, the G value, and the B value may be 100. In this case, the deviation of the R value is 1 ($|100-99|=1$), the deviation of the G value is 0 ($|100-100|=0$), and the deviation of the B value is 1 ($|100-101|=1$), and the sum DS of deviations may be 2 (1+0+1=2).

In an embodiment, for example, the timing controller 200 may generate the histogram of the sum DS of deviations. The timing controller 200 may calculate the number of the RGB data in which the sum DS of deviations is smaller than the reference deviation value RD by using the histogram, and may compare the number of the RGB data in which the sum DS of deviations is smaller than the reference deviation value RD to the second reference number RN2.

In a case, for example, as shown in FIG. 5, the number of the input saturation value IS smaller than the reference saturation value RS may be 150 (100+50=150), and the second reference number RN2 may be 1000. In this case, the timing controller 200 may determine that the input image data IMG does not represent the white image.

In an embodiment, the timing controller 200 may change the reference deviation value RD when the input image data IMG displaying the white image and the input image data IMG not displaying the white image are alternately input over N frames. In an alternative embodiment, the timing controller 200 may change the second reference number RN2 when the input image data IMG displaying the white image and the input image data IMG not displaying the white image are alternately input over N frames.

Accordingly, even when the input image data IMG displaying the white image and the input image data IMG not displaying the white image are alternately input from an outside (e.g., by another manufacturer) to find out the reference deviation value RS and/or the second reference number RN2 of an embodiment of the invention, the reference saturation value RS and/or the first reference number RN1 may be effectively prevented from being externally found out by being changed.

Figure 6:
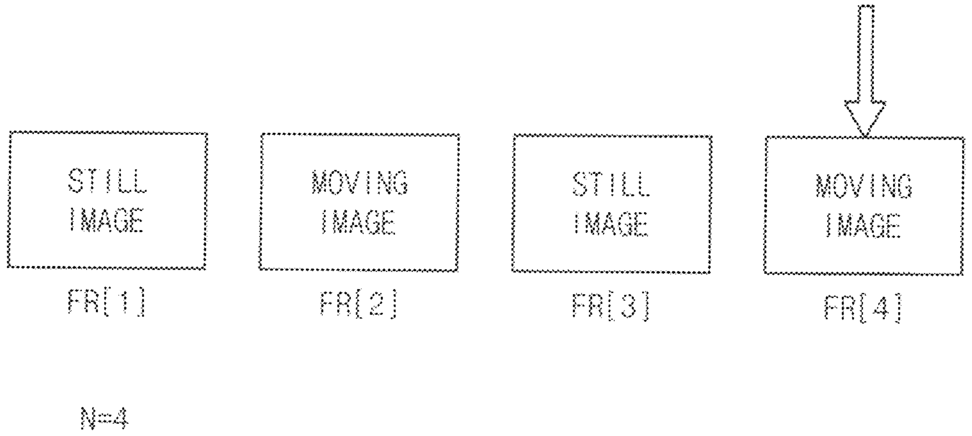
FIG. 6 is a conceptual diagram illustrating an example in which the display device of FIG. 1 changes a reference difference value.

FIG. 6 is a conceptual diagram illustrating an example in which the display device 1000 of FIG. 1 changes a reference difference value.

Referring to FIGS. 1 and 6, in an embodiment, the timing controller 200 may determine whether the input image data IMG displays a moving image. The timing controller 200 may determine the input image data IMG as the input image data IMG displaying the moving image when a difference value (or a value difference) between the input image data IMG of a previous frame and the input image data IMG of a current frame is greater than or equal to a reference difference value. In an embodiment, for example, the difference value between the input image data IMG of the previous frame and the input image data IMG of the current frame is a sum of the differences between the RGB data of the input image data IMG of the previous frame and the input image data IMG of the current frame. Accordingly, the timing controller 200 may determine the input image data IMG as the input image data IMG displaying the moving image when an image of the previous frame and an image of the current frame are substantially identical to each other (i.e., when the difference value is less than the reference difference value).

The timing controller 200 may change the reference difference value when the input image data IMG displaying the white image and the input image data IMG not displaying the white image are alternately input over N frames.

In an embodiment, for example, as shown in FIG. 6, in a case where N is 4, the input image data IMG in a first frame FR[1] displays a still image, the input image data IMG in a second frame FR[2] displays the moving image, the input image data IMG in the third frame FR[3] displays the still image, and the input image data IMG in a fourth frame FR[4] displays the moving image, the reference difference value may be changed in the fourth frame FR[4].

Accordingly, even when the input image data IMG displaying the moving image and the input image data IMG not displaying the moving image are alternately input from an outside (e.g., by another manufacturer) to find out the reference difference value, the reference difference value may be effectively prevented from being externally found out by being changed.

Figure 7:
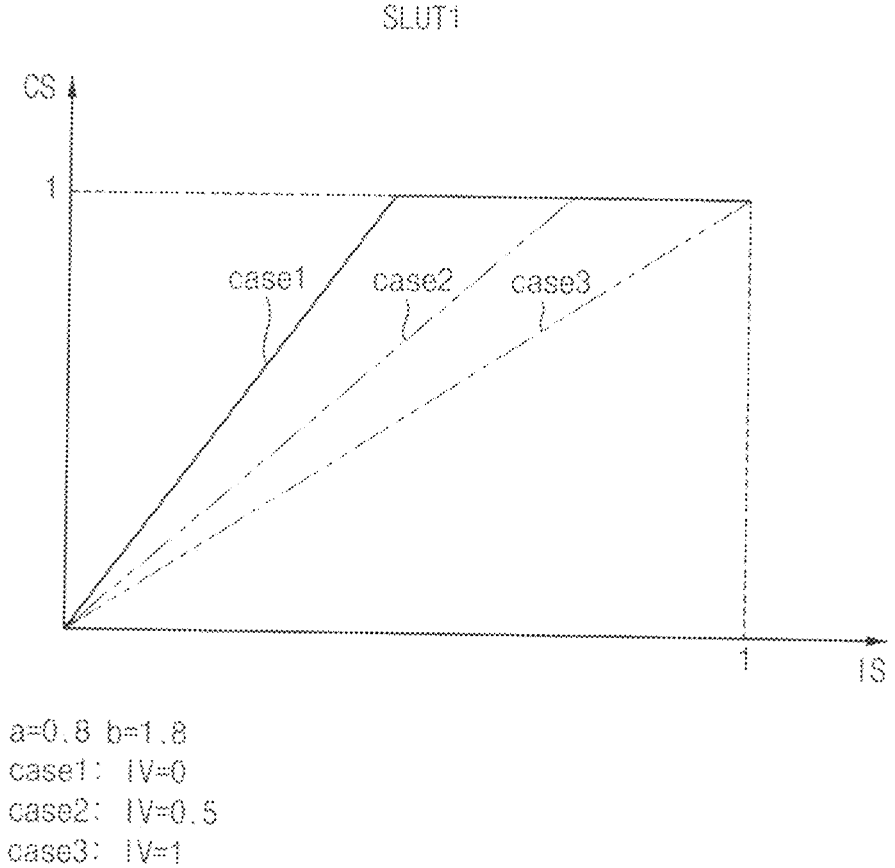
FIG. 7 is a graph illustrating an example of a first saturation lookup table of the display device of FIG. 1.
Figure 8:
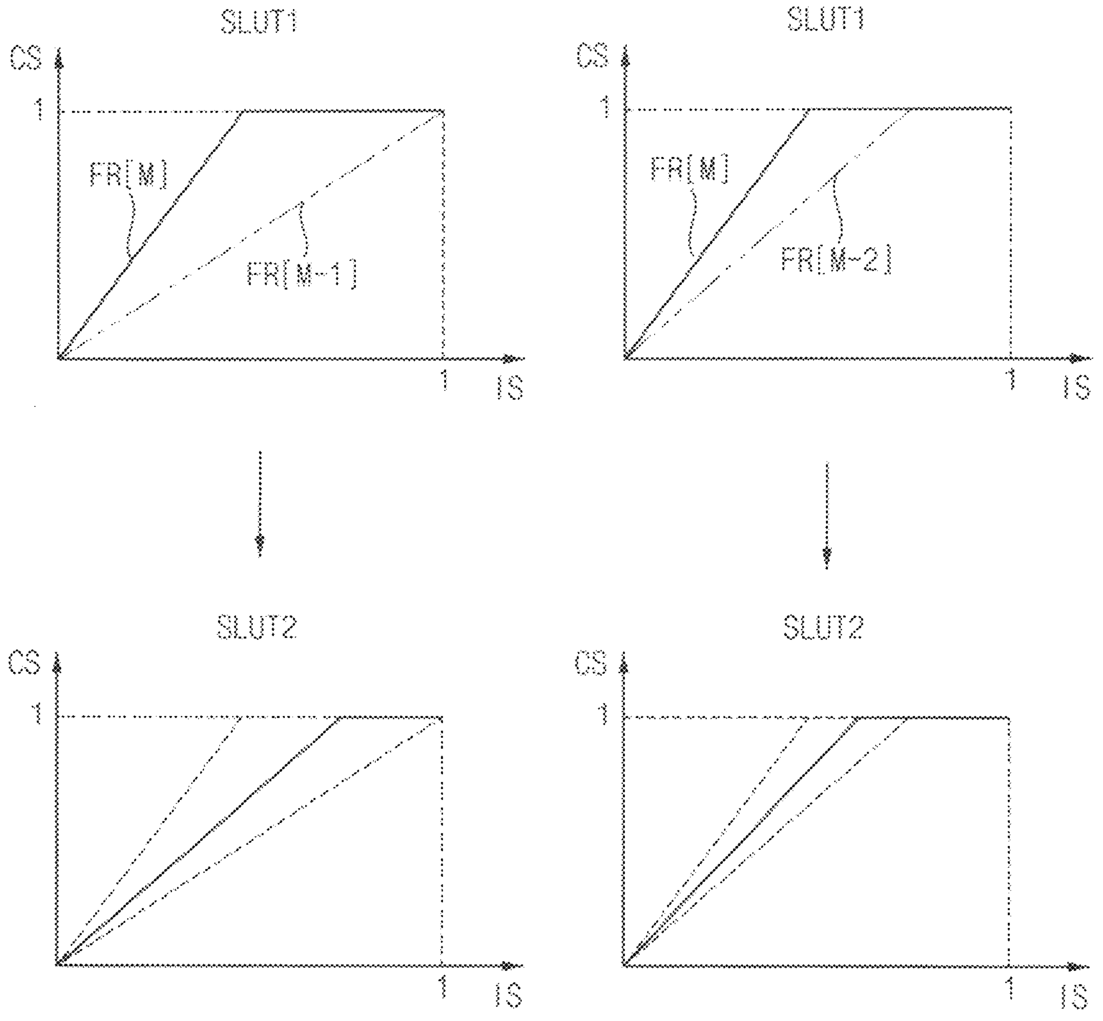
FIG. 8 is a conceptual diagram illustrating an example in which the display device of FIG. 1 generates a second saturation lookup table.
Figure 9:
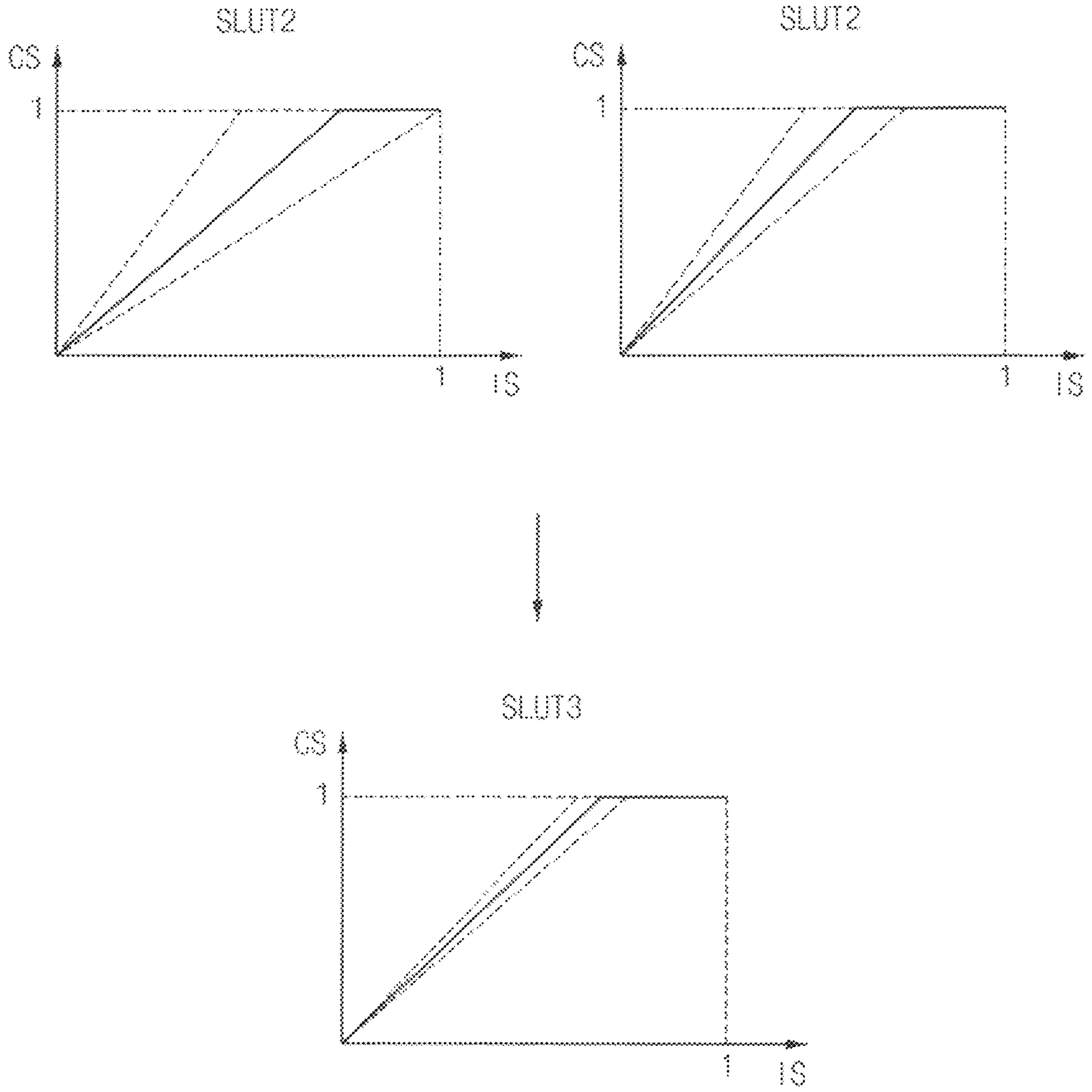
FIG. 9 is a conceptual diagram illustrating an example in which the display device of FIG. 1 generates a third saturation lookup table.

FIG. 7 is a graph illustrating an example of a first saturation lookup table SLUT1 of the display device 1000 of FIG. 1, FIG. 8 is a conceptual diagram illustrating an example in which the display device 1000 of FIG. 1 generates a second saturation lookup table SLUT2, and FIG. 9 is a conceptual diagram illustrating an example in which the display device 1000 of FIG. 1 generates a third saturation lookup table SLUT3.

Referring to FIGS. 1, and 7 to 9, in an embodiment, the timing controller 200 may determine whether the input image data IMG displays the white image and whether the input image data displays the moving image, and adjust the input saturation value IS of the input image data IMG based on whether the input image data IMG displays the white image and whether the input image data IMG displays the moving image to generate correction image data. The correction image data may include the correction saturation value CS generated by adjusting the input saturation value IS. That is, the correction saturation value CS may be a value to which the input saturation value IS is adjusted.

The timing controller 200 may convert the input image data IMG of the RGB domain into the HSV domain, generate the correction image data by adjusting the input saturation value IS, convert the correction image data of the HSV domain into the RGB domain, and generate the data signal DATA based on the correction image data of the RGB domain.

The timing controller 200 may maintain (not adjust) the input saturation value IS as it is when the input image data IMG displays the white image, and adjust the input saturation value IS based on the first saturation lookup table SLUT1 when the input image data IMG does not display the white image. The timing controller 200 may adjust the input saturation value IS based on second saturation lookup tables SLUT2 generated through interpolation between the first saturation lookup table SLUT1 of a current frame and the first saturation lookup table SLUT1 of each of previous frames when the input image data IMG does not display the white image and displays the moving image. The timing controller 200 may adjust the input saturation value IS based on the third saturation lookup table SLUT3 generated by calculating an average of the second saturation lookup tables SLUT2.

In an embodiment, for example, the timing controller 200 may maintain the input saturation value IS when the input image data IMG displays the white image. Accordingly, the display device 1000 may prevent a decrease in luminance and/or a change in color may be generated conspicuously.

In an embodiment, for example, when the input image data IMG does not display the white image and does not display the moving image, the timing controller 200 may adjust the input saturation value IS by using the first saturation lookup table SLUT1. Accordingly, the display device 1000 may increase saturation of an image by adjusting the input saturation value IS, such that the display device may reduce power consumption by displaying the image brighter without an increase in luminance.

In an embodiment, for example, when the input image data IMG does not display the white image and displays the moving image, the timing controller 200 may adjust the input saturation value IS by using the third saturation lookup table SLUT3. Accordingly, the display device 1000 may prevent a sudden change in the saturation lookup table used.

In an embodiment, as shown in FIG. 7, the first saturation lookup table SLUT1 may include the correction saturation value CS of the correction image data corresponding to the input saturation value IS, and differ according to an input brightness value IV of the input image data IMG. In an embodiment, for example, the correction saturation value CS may be determined using the following equation: $CS=IS*(IV*(-a)+b)$, where CS denotes the correction saturation value, IS denotes the input saturation value, IV denotes the input brightness value, a denotes a first saturation coefficient, and b denotes a second saturation coefficient. Here, the first saturation coefficient and the second saturation coefficient may be real numbers greater than or equal to 0.

In an embodiment, the first saturation lookup table SLUT1 may be changed based on the input brightness value IV. In a case, for example, the first saturation coefficient (a) may be 0.8, the second saturation coefficient (b) may be 1.8, and the saturation value (i.e., the input saturation value IS and the correction saturation value CS) may be between 0 and 1. A gradient (i.e., the input saturation value IS–the correction saturation value CS gradient) according to the first saturation lookup table SLUT1 may be greater when the input brightness value IV is 0 (case1) than when the input brightness value IV is 0.5 (case2), and may be greater when the input brightness value IV is 0.5 (case2) than when the input brightness value IV is 1 (case3).

The second saturation lookup table SLUT2 may be generated through the interpolation between the first saturation lookup table SLUT1 of the current frame and the first saturation lookup table SLUT1 of each of the previous frames. The third saturation lookup table SLUT3 may be generated by calculating an average of the second saturation lookup tables SLUT2.

In an embodiment, for example, the second saturation lookup tables SLUT2 of a M-th frame FR[M], where M is a positive integer greater than or equal to 3, may be generated through interpolation between the first saturation lookup table SLUT1 of the M-th frame FR[M] and the first saturation lookup table SLUT1 of a (M−1)-th frame FR[M−1] and interpolation between the first saturation lookup table SLUT1 of the M-th frame FR[M] and the first saturation lookup table SLUT1 of a (M−2)-th frame FR[M−2]. The third saturation lookup table SLUT3 of the M-th frame FR[M] may be generated by calculating an average of the second saturation lookup table SLUT2 generated through the interpolation between the first saturation lookup table SLUT1 of the M-th frame FR[M] and the first saturation lookup table SLUT1 of the (M−1)-th frame FR[M−1] and the second saturation lookup table SLUT2 generated through the interpolation between the first saturation lookup table SLUT1 of the M-th frame FR[M] and the first saturation lookup table SLUT1 of the (M−2)-th frame FR[M−2]. FIGS. 8 and 9 show an embodiment where the first saturation lookup tables SLUT1 of two previous frames are used, but are not limited thereto. In an alternative embodiment, for example, the display device 1000 may generate the second saturation lookup tables SLUT2 by using the first saturation lookup tables SLUT1 of three or more previous frames.

In an alternative embodiment, the second saturation lookup tables SLUT2 may be generated through interpolation of the first saturation lookup table SLUT1 of the current frame and the saturation lookup table used in each of previous frames.

Figure 10:
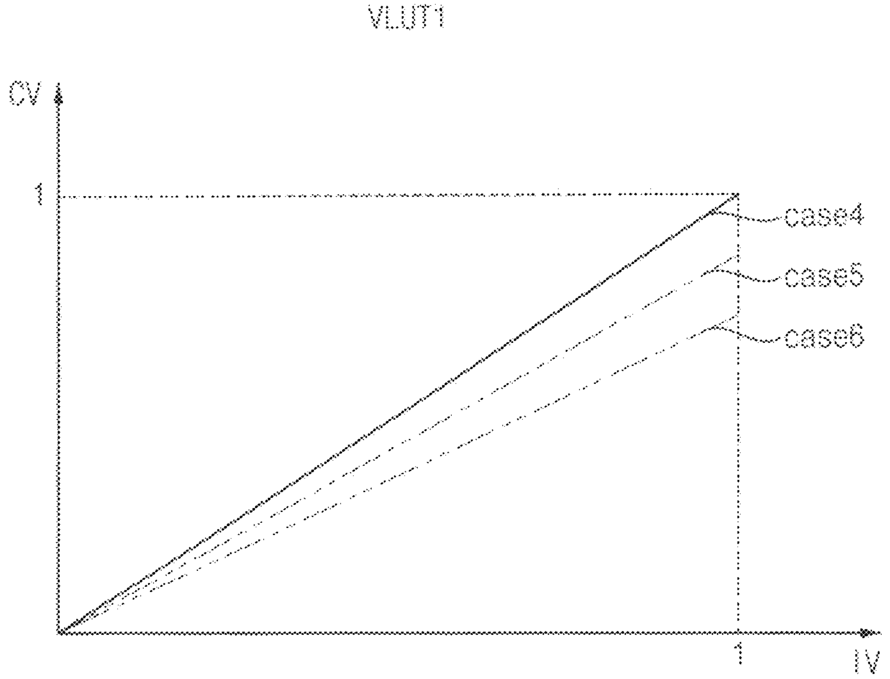
FIGS. 10 and 11 are graphs illustrating an example of a first brightness lookup table of the display device of FIG. 1.
Figure 11:
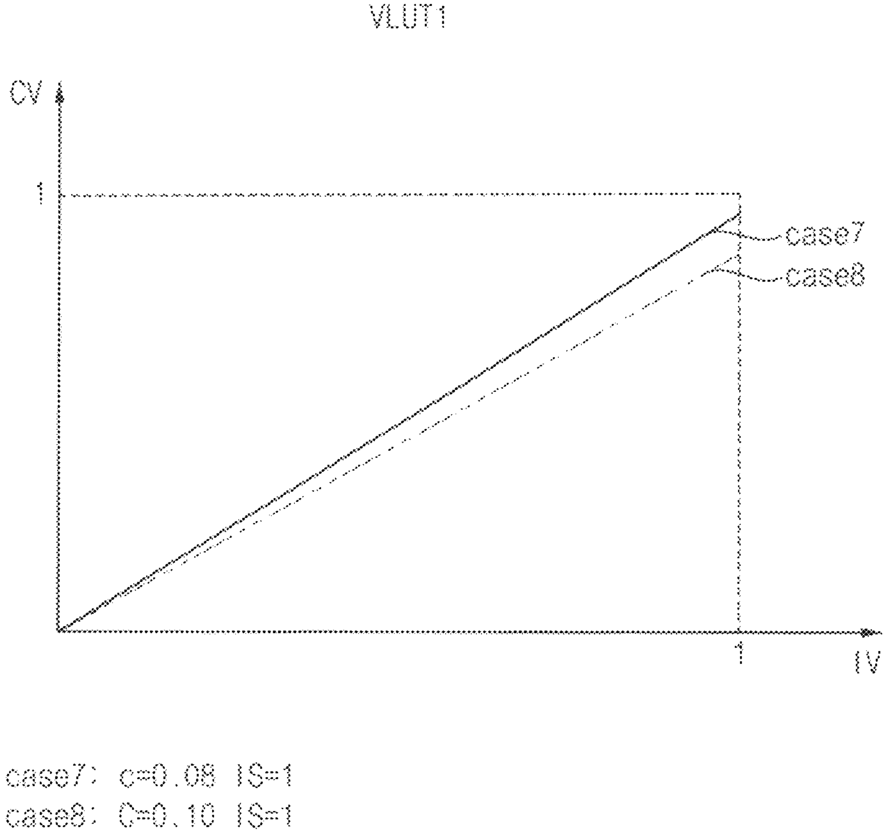
Figure 12:
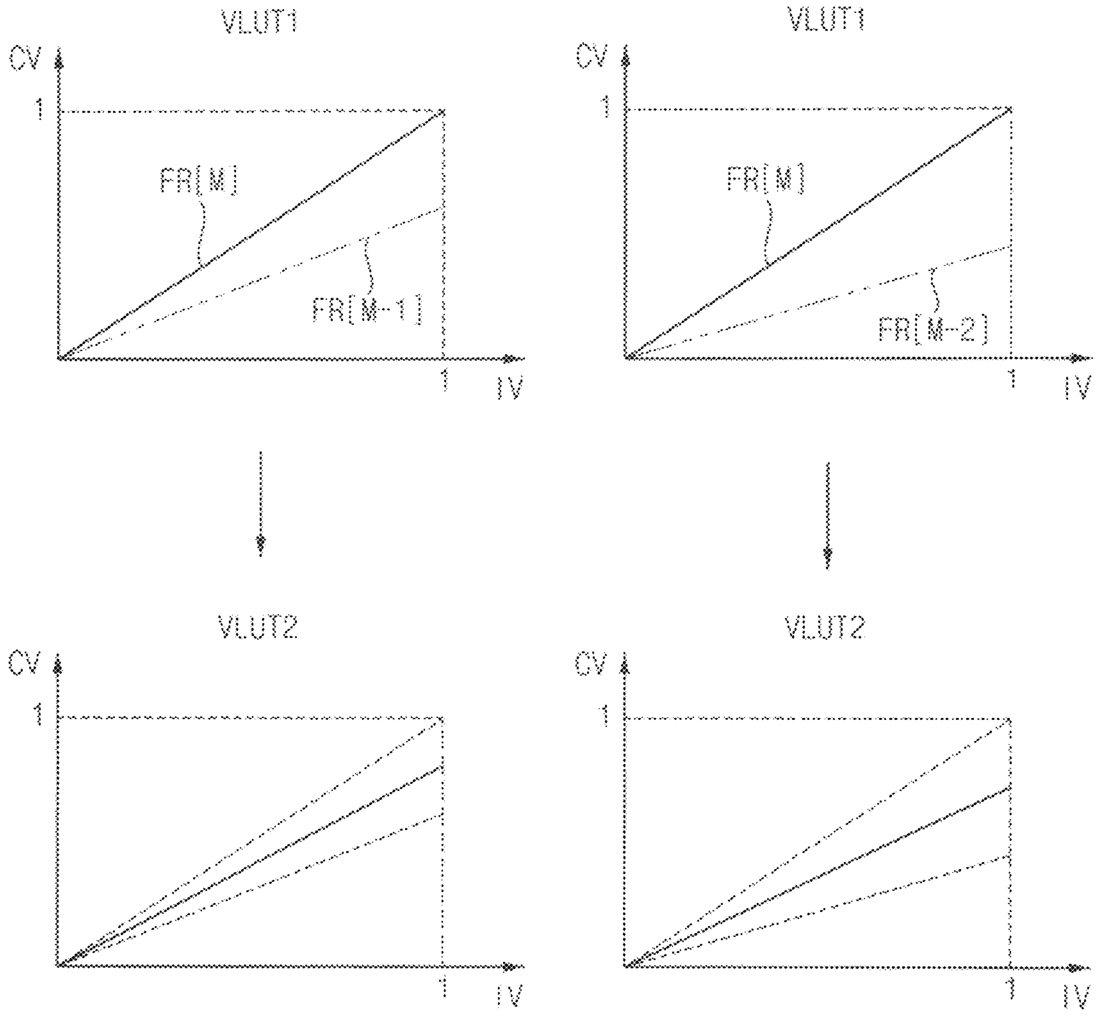
FIG. 12 is a conceptual diagram illustrating an example in which the display device of FIG. 1 generates a second brightness lookup table.
Figure 13:
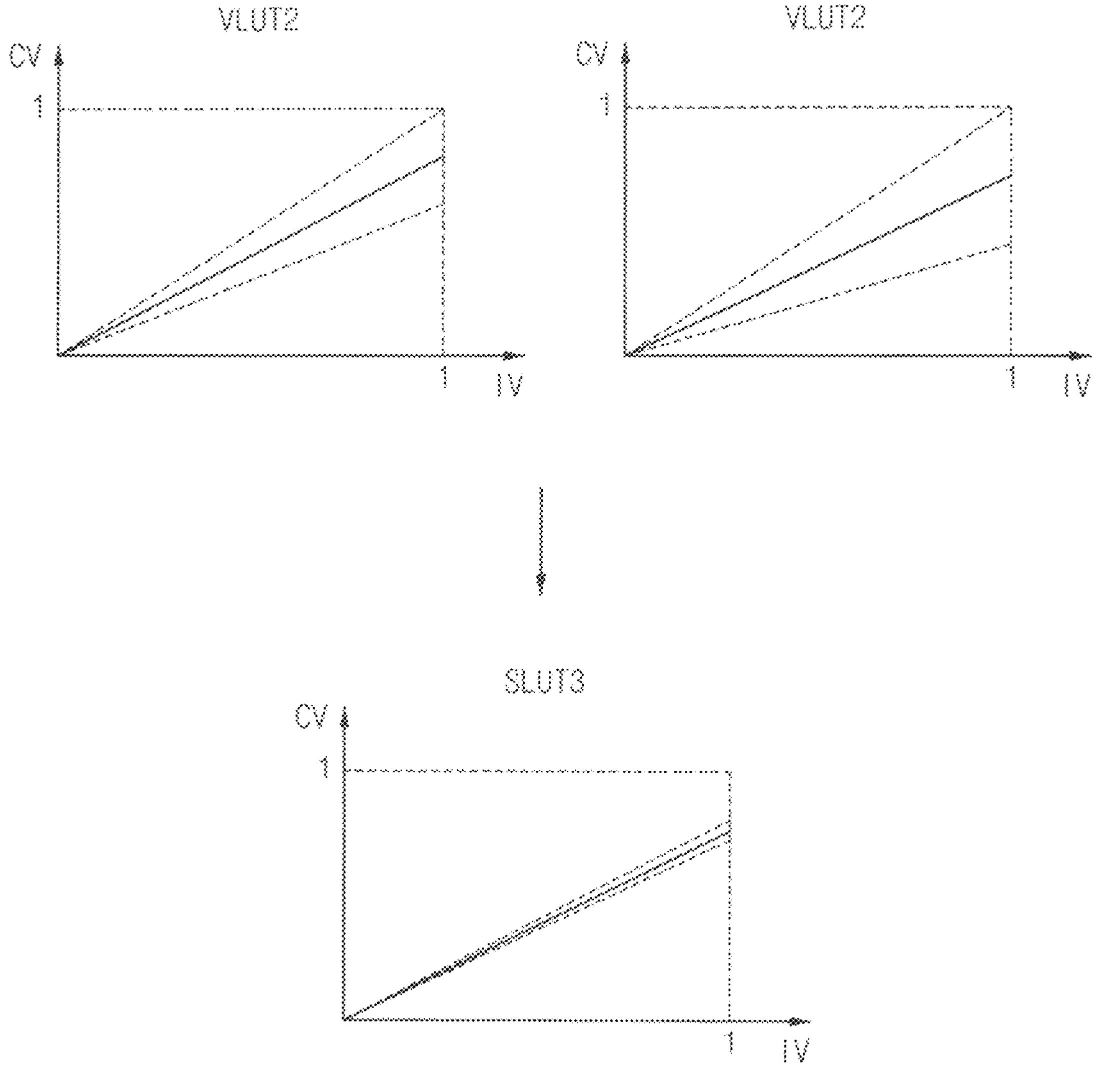
FIG. 13 is a conceptual diagram illustrating an example in which the display device of FIG. 1 generates a third brightness lookup table.

FIGS. 10 and 11 are graphs illustrating an example of a first brightness lookup table VLUT1 of the display device 1000 of FIG. 1, FIG. 12 is a conceptual diagram illustrating an example in which the display device 1000 of FIG. 1 generates a second brightness lookup table VLUT2, and FIG. 13 is a conceptual diagram illustrating an example in which the display device 1000 of FIG. 1 generates a third brightness lookup table VLUT3.

Referring to FIGS. 1, and 10 to 13, in an embodiment, the timing controller 200 may determine whether the input image data IMG displays the white image and whether the input image data displays the moving image, and adjust the input brightness value IV of the input image data IMG based on whether the input image data IMG displays the white image and whether the input image data IMG displays the moving image to generate correction image data. The correction image data may include the correction brightness value CV generated by adjusting the input brightness value IV. That is, the correction brightness value CV may be a value to which the input brightness value IV is adjusted.

The timing controller 200 may convert the input image data IMG of the RGB domain into the HSV domain, generate the correction image data by adjusting the input brightness value IV, convert the correction image data of the HSV domain into the RGB domain, and generate the data signal DATA based on the correction image data of the RGB domain.

The timing controller 200 may maintain the input brightness value IV when the input image data IMG displays the white image, and adjust the input brightness value IV based on the first brightness lookup table VLUT1 when the input image data IMG does not display the white image. The timing controller 200 may adjust the input brightness value IV based on second brightness lookup tables VLUT2 generated through interpolation between the first brightness lookup table VLUT1 of a current frame and the first brightness lookup table VLUT1 of each of previous frames when the input image data IMG does not display the white image and displays the moving image. The timing controller 200 may adjust the input brightness value IV based on the third brightness lookup table VLUT3 generated by calculating an average of the second brightness lookup tables VLUT2.

In an embodiment, for example, the timing controller 200 may maintain the input brightness value IV when the input image data IMG displays the white image. In an embodiment, for example, when the input image data IMG does not display the white image and does not display the moving image, the timing controller 200 may adjust the input brightness value IV by using the first brightness lookup table VLUT1.

In an embodiment, for example, when the input image data IMG does not display the white image and displays the moving image, the timing controller 200 may adjust the input brightness value IV by using the third brightness lookup table VLUT3. Accordingly, the display device 1000 may prevent a sudden change in the brightness lookup table used.

As shown in FIG. 10, the first brightness lookup table VLUT1 may include the correction brightness value CV of the correction image data corresponding to the input brightness value IV, and differ according to the input saturation value IS of the input image data IMG. In an embodiment, for example, the correction brightness value CV may be determined using the following equation: $CV=IV*(IS*(-c)+d)$, where CV denotes the correction brightness value, IS denotes the input saturation value, IV denotes the input brightness value, c denotes a first brightness coefficient, and d denotes a second brightness coefficient. Here, the first brightness coefficient and the second brightness coefficient may be real numbers greater than or equal to 0.

In a case, for example, the first brightness coefficient (c) may be 0.08, the second brightness coefficient (d) may be 1, and the brightness value (i.e., the input brightness value IV and the correction brightness value CV) may be between 0 and 1. A gradient (i.e., the input brightness value IV−the correction brightness value CV gradient) according to the first brightness lookup table VLUT1 may be greater when the input saturation value IS is 0 (case4) than when the input saturation value IS is 0.5 (case5), and may be greater when the input saturation value IS is 0.5 (case5) than when the input saturation value IS is 1 (case6).

The timing controller 200 may calculate an average value of the input saturation values IS, and increase the first brightness coefficient (c) when the average value of the input saturation values IS is less than the reference saturation value. In an embodiment, for example, the timing controller 200 may use a histogram of the input saturation value IS when calculating the average value of the input saturation value IS.

In an embodiment, for example, the correction brightness value CV may increase as the first brightness coefficient (c) increases (i.e., the correction brightness value CV according to case7 is greater than that of case8). Accordingly, when the average value of the input saturation value IS is small, the correction brightness value CV may be decreased by increasing the first brightness coefficient (c), such that the display device 1000 may reduce power consumption by decreasing the correction brightness value CV.

The second brightness lookup table VLUT2 may be generated through the interpolation between the first brightness lookup table VLUT1 of the current frame and the first brightness lookup table VLUT1 of each of the previous frames. The third brightness lookup table VLUT3 may be generated by calculating an average of the second brightness lookup tables VLUT2.

In an embodiment, for example, the second brightness lookup tables VLUT2 of a M-th frame FR[M] may be generated through interpolation between the first brightness lookup table VLUT1 of the M-th frame FR[M] and the first brightness lookup table VLUT1 of a (M−1)-th frame FR[M−1] and interpolation between the first brightness lookup table VLUT1 of the M-th frame FR[M] and the first brightness lookup table VLUT1 of a (M−2)-th frame FR[M−2]. The third brightness lookup table VLUT3 of the M-th frame FR[M] may be generated by calculating an average of the second brightness lookup table VLUT2 generated through the interpolation between the first brightness lookup table VLUT1 of the M-th frame FR[M] and the first brightness lookup table VLUT1 of the (M−1)-th frame FR[M−1] and the second brightness lookup table VLUT2 generated through the interpolation between the first brightness lookup table VLUT1 of the M-th frame FR[M] and the first brightness lookup table VLUT1 of the (M−2)-th frame FR[M−2]. FIGS. 12 and 13 use the first brightness lookup tables VLUT1 of two previous frames, but are not limited thereto. In an embodiment, for example, the display device 1000 may generate the second brightness lookup tables VLUT2 by using the first brightness lookup tables VLUT1 of three or more previous frames.

In an alternative embodiment, the second brightness lookup tables VLUT2 may be generated through interpolation between the first brightness lookup table VLUT1 of the current frame and the first brightness lookup table VLUT1 used in each of previous frames.

Figure 14:
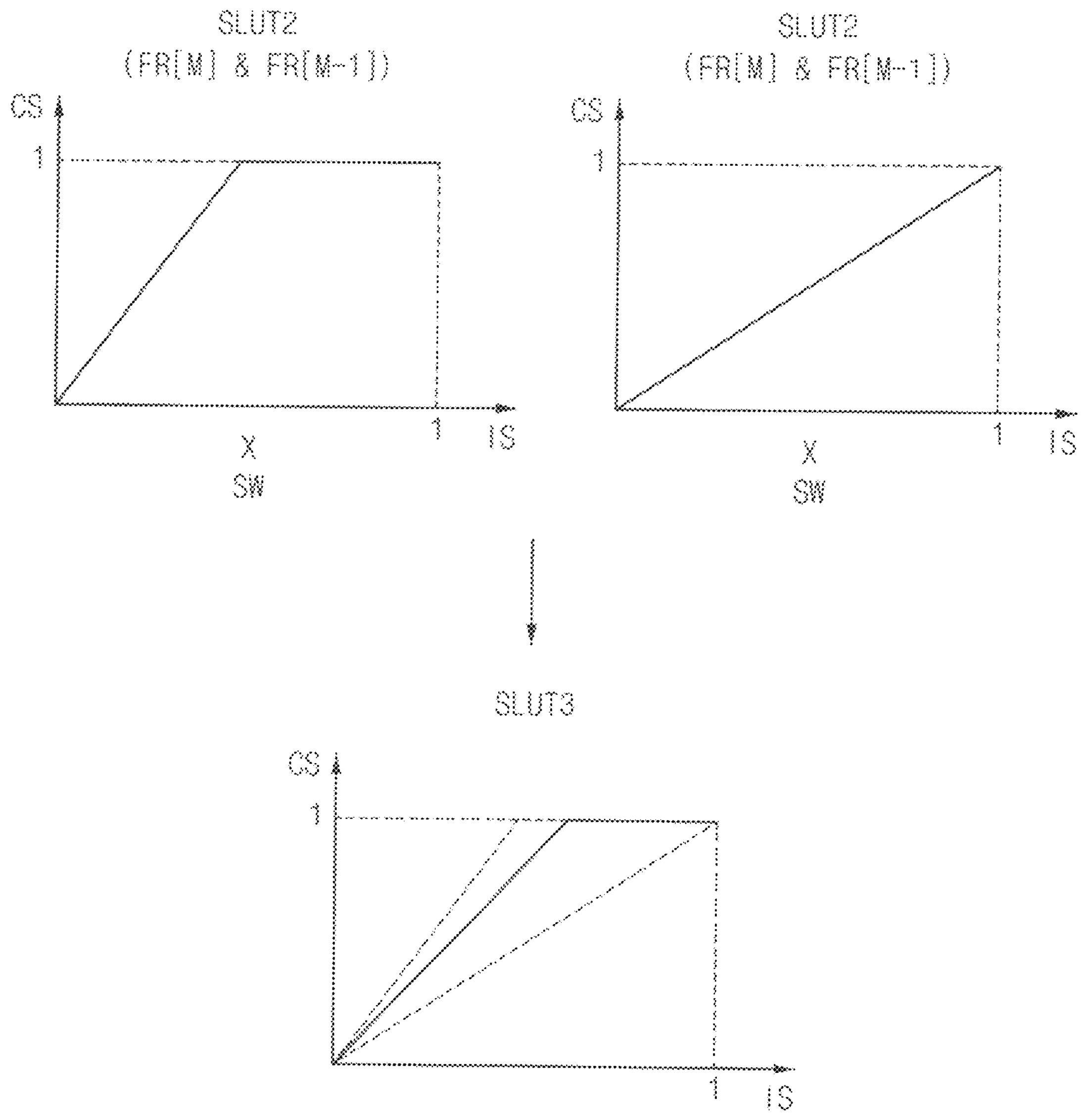
FIG. 14 is a conceptual diagram illustrating an example in which a display device generates a third saturation lookup table according to embodiments of the invention.

FIG. 14 is a conceptual diagram illustrating an example in which a display device generates the third saturation lookup table SLUT3 according to embodiments of the invention.

An embodiment of the display device shown in FIG. 14 is substantially the same as the embodiments of the display device 1000 described above except for the third saturation lookup table SLUT3. Thus, the same or like reference numerals are used to refer to the same or like elements, and any repetitive detailed description thereof will be omitted.

Referring to FIGS. 1 and 14, in an embodiment, the timing controller 200 may apply a saturation weight SW to each of the second saturation lookup tables SLUT2, and adjust the input saturation value IS based on the third saturation lookup table SLUT3 generated by calculating an average of the second saturation lookup tables SLUT2 applied the saturation weight SW.

In an embodiment, for example, the correction saturation value CS of each of the second saturation lookup tables SLUT2 to which the saturation weight SW is applied may be a value obtained by multiplying the saturation weight SW by the correction saturation value CS of each of the second saturation lookup tables SLUT2 before the saturation weight SW is applied.

The saturation weight SW may increases as a distance between two frames between which the interpolation is performed decreases. Accordingly, the third saturation lookup table SLUT3 may be closer to a saturation lookup table used in a frame close to the current frame than a frame far from the current frame.

Figure 15:
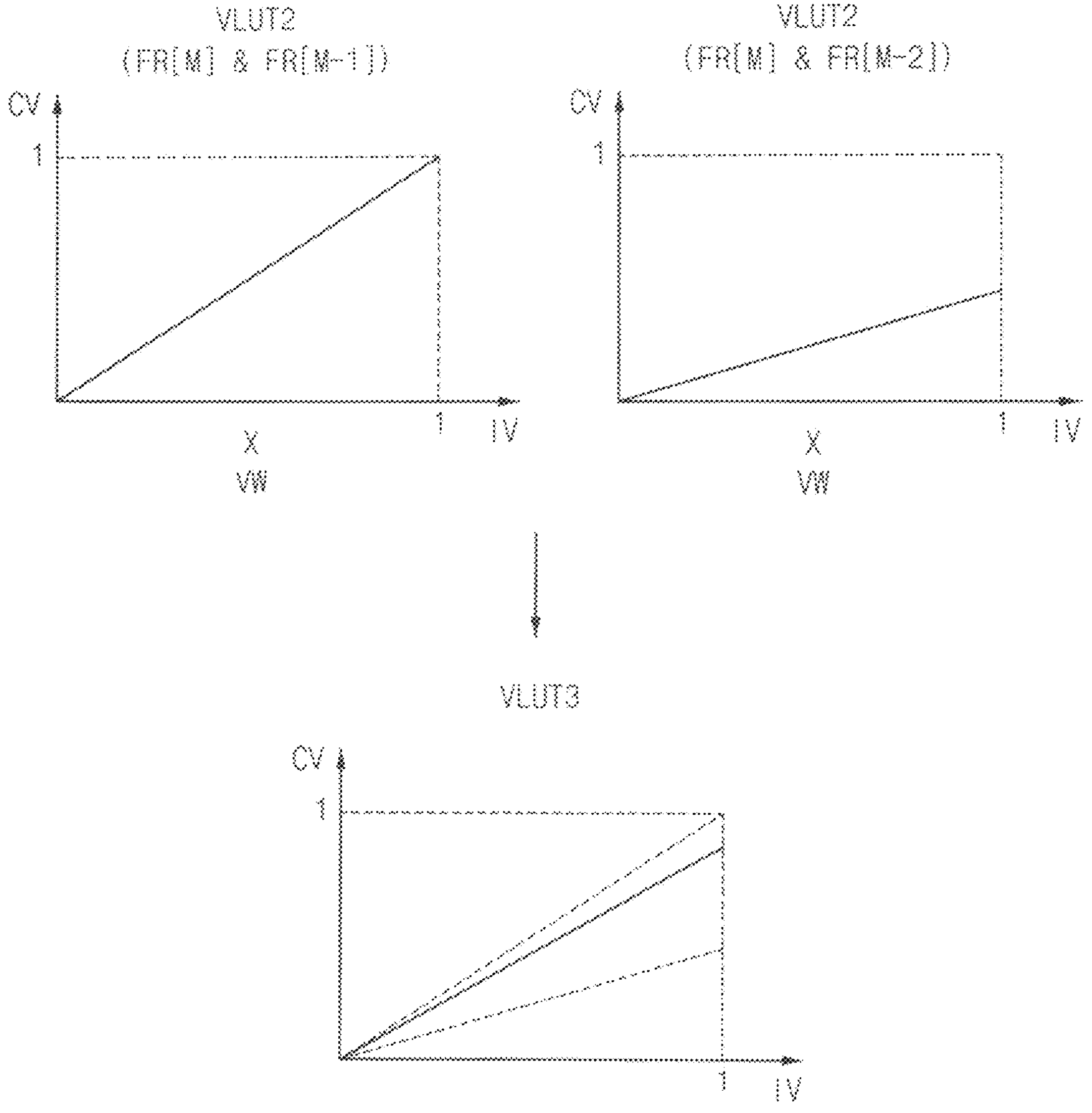
FIG. 15 is a conceptual diagram illustrating an example in which a display device generates a third brightness lookup table according to embodiments of the invention.

FIG. 15 is a conceptual diagram illustrating an example in which a display device generates the third brightness lookup table VLUT3 according to embodiments of the invention.

An embodiment of the display device shown in FIG. 15 is substantially the same as the embodiments of the display device 1000 described above except for the third brightness lookup table VLUT3. Thus, the same or like reference numerals are used to refer to the same or like elements, and any repetitive detailed description thereof will be omitted.

Referring to FIGS. 1 and 15, in an embodiment, the timing controller 200 may apply a brightness weight VW to each of the second brightness lookup tables VLUT2, and adjust the input brightness value IV based on the third brightness lookup table VLUT3 generated by calculating an average of the second brightness lookup tables VLUT2 applied the brightness weight VW.

In an embodiment, for example, the correction brightness value CV of each of the second brightness lookup tables VLUT2 to which the brightness weight VW is applied may be a value obtained by multiplying the brightness weight VW by the correction brightness value CV of each of the second brightness lookup tables VLUT2 before the brightness weight VW is applied.

The brightness weight VW may increases as a distance between two frames between which the interpolation is performed decreases. Accordingly, the third brightness lookup table VLUT3 may be closer to a brightness lookup table used in a frame close to the current frame than a frame far from the current frame.

In embodiments of the display device, as described above, both the input saturation value and the input brightness value may be adjusted, but are not limited thereto. In an alternative embodiment, for example, the display device of FIG. 1 may adjust only the input saturation value or only the input brightness value.

Figure 16:
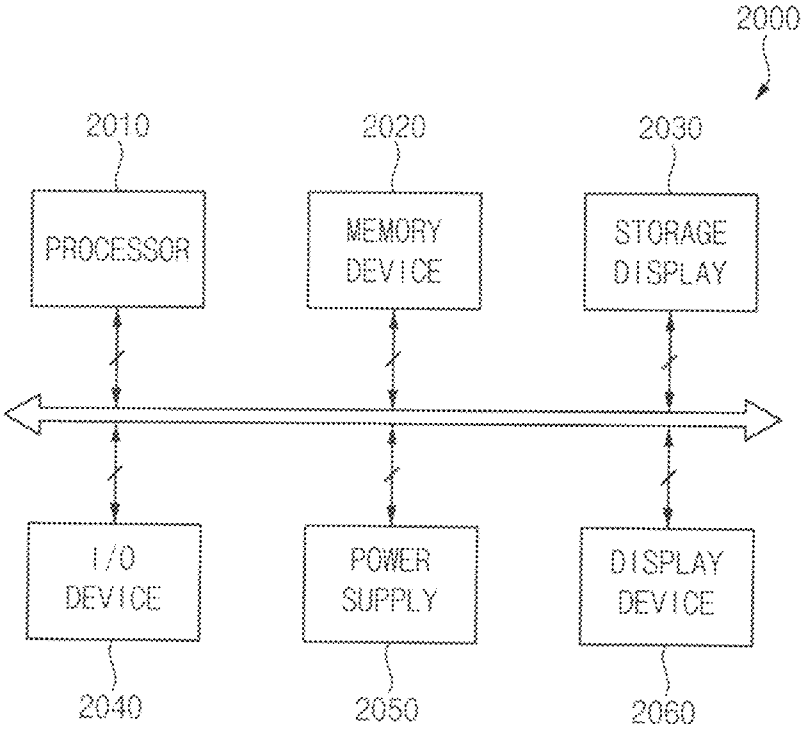
FIG. 16 is a block diagram showing an electronic device according to embodiments.
Figure 17:
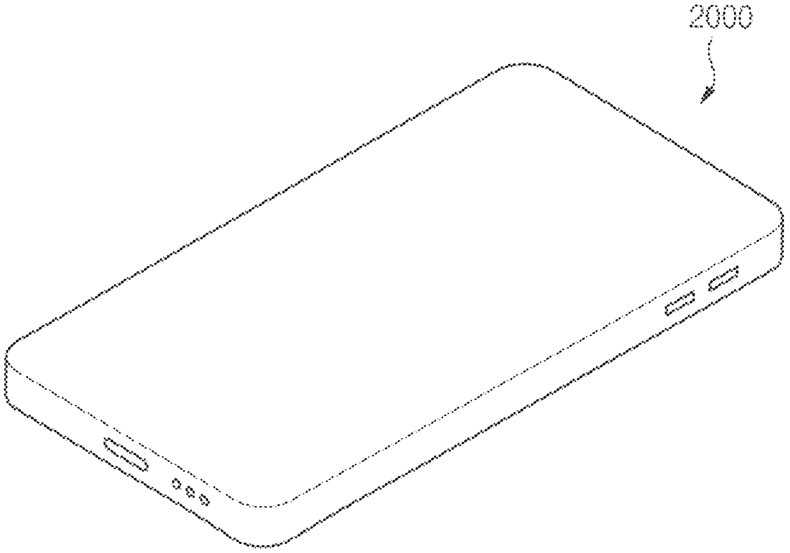
FIG. 17 is a diagram showing an example in which the electronic device of FIG. 16 is implemented as a smart phone.

FIG. 16 is a block diagram showing an electronic device according to embodiments, and FIG. 17 is a diagram showing an example in which the electronic device of FIG. 16 is implemented as a smart phone.

Referring to FIGS. 16 and 17, an embodiment of the electronic device 2000 may include a processor 2010, a memory device 2020, a storage device 2030, an input/output (I/O) device 2040, a power supply 2050, and a display device 2060. Here, the display device 2060 may be the display device 1000 of FIG. 1. In addition, the electronic device 2000 may further include a plurality of ports for communicating with a video card, a sound card, a memory card, a universal serial bus (USB) device, other electronic devices, etc. In an embodiment, as shown in FIG. 17, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, etc.

The processor 2010 may perform various computing functions. The processor 2010 may be a micro-processor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. For example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. In an embodiment, for example, the display device 2060 may be an organic light emitting display device or a quantum dot light emitting display device, but is not limited thereto. The display device 2060 may be coupled to other components via the buses or other communication links. In such an embodiment, the display device 2060 may adjust the input saturation value and the input brightness value when the white image is not displayed and may prevent a sudden change in saturation when a moving image is displayed by adjusting the input saturation value and the input brightness value based on whether the input image data displays the white image and whether the input image data displays the moving image to generate correction image data.

In an embodiment, as described above, the display device 2060 may include a display panel including pixels, and a display panel driver configured to drive the display panel. The display panel driver may determine whether input image data displays a white image and whether the input image data displays a moving image, and adjust input saturation value of the input image data based on whether the input image data displays the white image and whether the input image data displays the moving image to generate correction image data.

In an alternative embodiment, as described above, the display device 2060 may include a display panel including pixels, and a display panel driver configured to drive the display panel. The display panel driver may determine whether input image data displays a white image and whether the input image data displays a moving image, and adjust an input brightness value of the input image data based on whether the input image data displays the white image and whether the input image data displays the moving image to generate correction image data.

Embodiments of the inventions may be applied to any electronic device including the display device. For example, embodiments of the inventions may be applied to a television (TV), a digital TV, a three-dimensional (3D) TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including pixels; and a display panel driver which drives the display panel, wherein the display panel driver determines whether input image data displays a white image and whether the input image data displays a moving image, and adjusts an input saturation value of the input image data based on whether the input image data displays the white image and whether the input image data displays the moving image to generate correction image data, wherein the display panel driver calculates a sum of deviations of an R value, a G value, and a B value of RGB data of the input image data for each of the pixels, and determines the input image data as the input image data displaying the white image when a number of the RGB data in which the sum of the deviations is less than a reference deviation value is greater than or equal to a second reference number.

2. The display device of claim 1, wherein the display panel maintains the input saturation value when the input image data displays the white image, and wherein the display panel driver adjusts the input saturation value based on a first saturation lookup table when the input image data does not display the white image.

3. The display device of claim 2, wherein the first saturation lookup table includes a correction saturation value of the correction image data corresponding to the input saturation value, and wherein the first saturation lookup table is changed based on input brightness value of the input image data.

4. The display device of claim 3, wherein the correction saturation value is determined using the following equation:

$$CS=IS*(IV*(-a)+b),$$

wherein

CS denotes the correction saturation value,

IS denotes the input saturation value,

IV denotes the input brightness value, a denotes a first saturation coefficient, and b denotes a second saturation coefficient.

5. The display device of claim 2, wherein the display panel driver adjusts the input saturation value based on the first saturation lookup table of a current frame and second saturation lookup tables generated through interpolation between the first saturation lookup table of the current frame and the first saturation lookup table of each of previous frames when the input image data does not display the white image and displays the moving image.

6. The display device of claim 5, wherein the display panel driver adjusts the input saturation value based on a third saturation lookup table generated by calculating an average of the second saturation lookup tables.

7. The display device of claim 5, wherein the display panel driver applies a saturation weight to each of the second saturation lookup tables, and adjusts the input saturation value based on a third saturation lookup table generated by calculating an average of the second saturation lookup tables to which the saturation weight is applied.

8. The display device of claim 7, wherein the saturation weight increases as a distance between two frames between which the interpolation is performed decreases.

9. The display device of claim 2, wherein the display panel driver maintains an input brightness value of the input image data when the input image data displays the white image, and wherein the display panel driver adjusts the input brightness value based on a first brightness lookup table when the input image data does not display the white image.

10. The display device of claim 9, wherein the first brightness lookup table includes a correction brightness value of the correction image data corresponding to the input brightness value, and wherein the first brightness lookup table is changed based on the input saturation value of the input image data.

11. The display device of claim 10, wherein the correction brightness value is determined using the following equation: CV=IV*(IS*(−c)+d), wherein CV denotes the correction brightness value, IS denotes the input saturation value, IV denotes the input brightness value, c denotes a first brightness coefficient, and d denotes a second brightness coefficient.

12. The display device of claim 11, wherein the display panel driver calculates an average value of the input saturation value, and increases the first brightness coefficient when the average value of the input saturation value is less than a reference saturation value.

13. The display device of claim 10, wherein the display panel driver adjusts the input brightness value based on the first brightness lookup table of a current frame and second brightness lookup tables generated through interpolation between the first brightness lookup table of the current frame and the first brightness lookup table of each of previous frames when the input image data does not display the white image and displays the moving image.

14. The display device of claim 1, wherein the display panel driver determines the input image data as the input image data displaying the white image when a number of the input saturation value smaller than a reference saturation value is greater than or equal to a first reference number.

15. The display device of claim 14, wherein the display panel driver changes the reference saturation value when the input image data displaying the white image and the input image data not displaying the white image are alternately input over N frames, wherein N is a positive integer greater than or equal to 2.

16. The display device of claim 1, wherein the display panel driver determines the input image data as the input image data displaying the moving image when a difference value between the input image data of a previous frame and the input image data of a current frame is greater than or equal to a reference difference value.

17. The display device of claim 16, wherein the display panel driver changes the reference difference value when the input image data displaying the moving image and the input image data not displaying the moving image are alternately input over N frames, wherein N is a positive integer greater than or equal to 2.

18. A display device comprising:

a display panel including pixels; and a display panel driver which drives the display panel, wherein the display panel driver determines whether input image data displays a white image and whether the input image data displays a moving image, and adjusts input brightness value of the input image data based on whether the input image data displays the white image and whether the input image data displays the moving image to generate correction image data, wherein the display panel driver maintains the input brightness value when the input image data displays the white image, wherein the display panel driver adjusts the input brightness value based on a first brightness lookup table when the input image data does not display the white image, wherein the first brightness lookup table includes a correction brightness value of the correction image data corresponding to the input brightness value, and wherein the first brightness lookup table is changed based on an input saturation value of the input image data.

19. A display device comprising:

a display panel including pixels; and a display panel driver which drives the display panel, wherein the display panel driver determines whether input image data displays a white image and whether the input image data displays a moving image, and adjusts an input saturation value of the input image data based on whether the input image data displays the white image and whether the input image data displays the moving image to generate correction image data, wherein the display panel driver determines the input image data as the input image data displaying the white image when a number of the input saturation value smaller than a reference saturation value is greater than or equal to a first reference number, and wherein the display panel driver changes the reference saturation value when the input image data displaying the white image and the input image data not displaying the white image are alternately input over N frames, wherein N is a positive integer greater than or equal to 2.

* * * * *